(12) United States Patent
Hoja et al.

(10) Patent No.: US 11,173,680 B2
(45) Date of Patent: Nov. 16, 2021

(54) METHOD FOR OPTIMIZING MOVEMENT PROFILES, METHOD FOR PROVIDING MOVEMENT PROFILES, CONTROL DEVICE, SYSTEM AND COMPUTER PROGRAM PRODUCT

(71) Applicant: Siemens Aktiengesellschaft, Munich (DE)

(72) Inventors: Stephan Hoja, Cadolzbrug (DE); Oleg Schlegel, Erlangen (DE); Fabian Lorz, Roettenbach (DE)

(73) Assignee: Siemens Aktiengesellschaft, Munich (DE)

( * ) Notice: Subject to any disclaimer, the term of this patent is extended or adjusted under 35 U.S.C. 154(b) by 14 days.

(21) Appl. No.: 15/791,971

(22) Filed: Oct. 24, 2017

(65) Prior Publication Data
US 2018/0117869 A1    May 3, 2018

(30) Foreign Application Priority Data

Oct. 25, 2016    (EP) .................................... 16195488

(51) Int. Cl.
*B30B 15/14*    (2006.01)
*G05B 19/418*    (2006.01)
(Continued)

(52) U.S. Cl.
CPC ............ *B30B 15/146* (2013.01); *B21D 43/05* (2013.01); *B25J 9/1682* (2013.01); *B30B 15/148* (2013.01);
(Continued)

(58) Field of Classification Search
None
See application file for complete search history.

(56) References Cited

U.S. PATENT DOCUMENTS 3,199,443 A * 8/1965 Danly .................... B21D 43/05
100/207
4,056,198 A * 11/1977 Boserup ............... B21D 43/105
414/416.01
(Continued)

FOREIGN PATENT DOCUMENTS

CN         1619184         5/2005
CN         102187036       9/2011
(Continued)

OTHER PUBLICATIONS

Office Action dated Dec. 11, 2018 issued in Japanese Patent Application No. 2017-199581.
(Continued)

*Primary Examiner* — Mohammad Ali
*Assistant Examiner* — David Earl Ogg
(74) *Attorney, Agent, or Firm* — Cozen O'Connor (57) ABSTRACT

A control device, a system and methods for optimizing and providing movement profiles, wherein the movement profiles serve for determining the movement of tools of a press and the movement of a receiving element for a workpiece of a transfer system, where transfer movement profiles are synchronized with one another via press movement profiles, the synchronization of the transfer movement profiles particularly occurs by chronologically shifting synchronization points via boundary conditions such that an offset of the press movement profiles can be determined via the synchronization, so that the workpiece can be processed as quickly as possible through the system.

19 Claims, 5 Drawing Sheets

(51) Int. Cl.
    *B25J 9/16*         (2006.01)
    *B21D 43/05*      (2006.01)
    *B30B 15/26*      (2006.01)
    *G05B 13/04*      (2006.01)

(52) U.S. Cl.
    CPC ............ *B30B 15/26* (2013.01); *G05B 13/047* (2013.01); *G05B 19/41815* (2013.01); *G05B 2219/32291* (2013.01); *G05B 2219/32294* (2013.01); *G05B 2219/39105* (2013.01); *G05B 2219/45142* (2013.01); *Y02P 90/02* (2015.11)

(56) References Cited

U.S. PATENT DOCUMENTS

| | | | | |
|---|---|---|---|---|
| 4,998,206 | A * | 3/1991 | Jones | G05B 19/4097 |
| | | | | 700/145 |
| 7,976,263 | B2 * | 7/2011 | Barker | H01L 21/67778 |
| | | | | 414/416.11 |
| 2007/0266363 | A1 | 11/2007 | Barrett et al. | |
| 2009/0177306 | A1 * | 7/2009 | Bosga | B30B 1/266 |
| | | | | 700/103 |
| 2010/0234974 | A1 * | 9/2010 | Bosga | B30B 15/148 |
| | | | | 700/100 |
| 2011/0005868 | A1 * | 1/2011 | Suzuki | H01L 21/67772 |
| | | | | 187/391 |
| 2013/0280990 | A1 | 10/2013 | Geiser et al. | |
| 2014/0364997 | A1 * | 12/2014 | Kaneko | B21D 43/105 |
| | | | | 700/228 |
| 2015/0294044 | A1 * | 10/2015 | Schaer | B21D 43/05 |
| | | | | 700/112 |
| 2016/0179079 | A1 | 6/2016 | Kram et al. | |

FOREIGN PATENT DOCUMENTS

| | | |
|---|---|---|
| CN | 103048146 | 4/2013 |
| CN | 103372688 | 10/2013 |
| CN | 105717868 | 6/2016 |
| EP | 1615090 | 1/2006 |
| EP | 1705541 | 9/2006 |
| EP | 2024796 A1 | 2/2009 |
| EP | 2808750 | 12/2014 |
| EP | 2024796 B1 | 9/2015 |
| JP | H 05-70729 U | 9/1993 |
| JP | H 07-1060 | 1/1995 |
| JP | 2005-074476 | 3/2005 |
| JP | 2005-216112 | 8/2005 |
| JP | 2008-246529 | 10/2008 |
| JP | 2009-539613 | 11/2009 |
| JP | 2015-100807 | 6/2015 |
| WO | WO 2008/155190 | 12/2008 |

OTHER PUBLICATIONS

Office Action dated Jun. 18, 2019 issued in Japanese Patent Application No. 2017-199581.
Office Action dated Sep. 4, 2019 issued in Chinese Patent Application No. 201710709586.2.
Office Action dated Apr. 1, 2020 issued in Chinese Patent Application No. 201710709586.2.
Casanelles, et al., "Towards High Performance in Press Automation, An ABB Review," 2015, pp. 3212-3215.
Hui, "Optimum Design and Stimulation of Hybrid-Driven Mechanical Press for Precision Drawing," Feb. 2004, vol. 16, No. 4, pp. 211-215.

* cited by examiner

METHOD FOR OPTIMIZING MOVEMENT PROFILES, METHOD FOR PROVIDING MOVEMENT PROFILES, CONTROL DEVICE, SYSTEM AND COMPUTER PROGRAM PRODUCT

BACKGROUND OF THE INVENTION

1. Field of the Invention

The invention relates to a method for optimizing movement profiles, a method for providing the movement profiles, a control device, a system and a computer program product.

2. Description of the Related Art

In particular in press lines that run in a fully automated manner, the workpieces are transferred from one press to a further press by a transfer system. The transfer system has receiving elements for the receiving of workpieces, where the workpieces are processed in succession by the respective press.

It is regularly time-consuming to set up such a system and to synchronize the respective movements with respect to one another. Such a system has a plurality of presses, where two of the presses are connected respectively via a transfer system.

SUMMARY OF THE INVENTION

In view of the foregoing, it is therefore an object of the invention to better coordinate movements in the system with respect to one another and to simplify a setting up of such a system.

This and other objects and advantages are achieved in accordance with the invention by a method for optimizing profiles, a computer program product, a method for providing the optimized profiles, a control device and a system in which the method for optimizing movement profiles is implemented, where the system has at least one press with a tool and a plurality of transfer systems, where the movement of the respective tool is described respectively by a press movement profile, and the movement of the respective transfer system is described respectively by a transfer movement profile, where the optimizing of the movement profiles comprises the following steps:

the respective transfer movement profile is preset;
synchronization points are preset via the respective transfer movement profile, where the synchronization points define the entry of the receiving element into the press and the exit of the receiving element from the press;
instants of time or master rotation angles are respectively assigned to the synchronization points;
a first time range or a first master rotation angle range are defined between the first synchronization point and the second synchronization point;
a second time range or a second master rotation angle range are defined between the third synchronization point and the fourth synchronization point;
the time ranges or the master rotation angle ranges are shortened successively to a minimum time or to a minimum rotation angle range, as long as preset boundary conditions are maintained;
with the minimum times or with the minimum rotation angle ranges the respective press movement profiles are created.

Although the invention refers only to a press, the press can also be executed by a different production machine and a packaging machine or another processing machine.

The transfer system serves for the transference of a workpiece from one press to a further press. In addition, the transfer system serves to introduce the workpiece into the press and to extract the tool from the press. The transfer system comprises at least one receiving element, where the receiving element serves for the reception and transport of the workpiece.

The workpiece is processed by the respective press.

The system preferably serves for the step-by-step processing of the workpiece. The workpiece therefore runs successively through a plurality of presses.

Usually, the press has an upper tool for processing the workpiece and a lower tool for receiving the workpiece, where in a simple case only the upper tool is moved for processing. The respective press is advantageously constructed as a servo press.

However, the invention is also able to be applied if the press is configured as a drawing cushion press.

A movement profile describes the movement of the tool of the respective press (press movement profile) or the movement of a receiving element of the transfer system (transfer movement profile). The movement is advantageously described by a locus curve, where a speed and/or a (torsional) moment are allocated at least in certain areas to points of the locus curve. In the case of the transfer movement profile, an alignment of the respective receiving element can also be preset.

The press movement profile preferably describes the movement of the upper tool. The movement of the tool usually occurs periodically in a vertical direction up and down. Usually, the press movement profile is preset only during the processing of the workpiece, i.e., as long as the upper tool touches the workpiece. The press is preferably constructed as a servo press. In servo presses, the press movement profile can be freely preset. The press movement profile is preferably preset by a cam function. In such a press movement profile, the periodic movement can be adapted to the respectively existing requirements.

The respective press movement profile is advantageously preset as a cam function. The cam function prescribes the movement of the respective tool as a function of a master rotation angle. The master rotation angle is prescribed by a virtual axis, where the virtual axis is associated with the system.

The individual movement profiles are advantageously configured respectively identically, except for an offset.

The transfer movement profile is advantageously likewise oriented to the master rotation angle of the virtual axis.

The transfer movement profile has four synchronization points, where the first synchronization point defines the entry of the second transfer system into the press, the second synchronization point defines the exit of the second transfer system from the press, the third synchronization point defines the entry of the first transfer system into the press, and the fourth synchronization point defines the exit of the first transfer system from the press.

The second transfer system therefore serves for the removal of the workpiece from the press, and the first transfer system then serves for the introduction of a further workpiece into the press. Normally, the extraction of the (processed) workpiece occurs before the introduction of the further workpiece.

The respective synchronization points correspond to time points or master rotation angles of the virtual axis.

The locus curve of the respective transfer movement profile results from the geometry and the dimensions of the respective press, in particular the respective tool of the presses, and from the geometry and the dimensions of the workpiece. The locus curve (also designated as path curve) is calculated such that the workpiece, without collision with the press, can be brought out therefrom and optionally introduced into the respective further press.

The speed is usually limited by the motor power of the transfer system and by the receiving elements.

In an embodiment of the invention, the transfer movement profiles are synchronized such that, as soon as the second transfer system can receive the workpiece from the press, the transfer system enters into the press to extract the workpiece into the press. The second transfer system removes the workpiece from the press. As soon as the workpiece has been received from the lower tool of the press, the first transfer system can place a (new) workpiece on the lower tool of the press. If the first transfer system were to wait until the second transfer system had left the press with the workpiece, in order to enter, time would be lost. Therefore, the first transfer system already enters into the press earlier, in order to place the (new) workpiece on the lower tool. Here, the respective transfer system or, respectively, the workpiece must not collide with one another workpiece or with the press. Therefore, the respective movement profile must maintain boundary conditions. The synchronization occurs through the synchronization points, where the first and the second synchronization point define an extraction time of the workpiece. In addition, the third and the fourth synchronization points define an introduction time.

In the context of the method, time ranges "extraction time" and "introduction time" are overlapped, and therefore are figuratively shifted over one another. Through the chronological overlapping, as short a time as possible can be determined in which, maintaining the boundary conditions, a transfer system is situated in the press. Through the shortening of the time, the press can run more quickly, i.e., the speed of the first movement profile can be increased. An increase of the speed leads to an increase of the stroke rate of the press. In addition, through a synchronization of the respective press movement profiles with respect to one another, the passage of the respective workpiece through the system can be shortened.

In an advantageous embodiment of the method, synchronization of the respective press movement profiles with respect to one another via an offset is also included as a further step.

An offset is understood to mean a time offset or a master rotation angle offset of the virtual axis of the respective press movement profile to a further press movement profile.

In otherwise identical movement profiles, in particular movement profiles preset by the same cam function, an offset of the movement profiles corresponds to an in phase following of the one press movement profile of another press movement profile.

By the offset, a shortening of the processing time of the workpiece is possible in a preset system. Thus, the throughput of a system can be advantageously increased.

In a further advantageous configuration of the method, the offset is set such that as short a throughput time as possible of a workpiece through the system results.

A particularly simple adaptation of the movement profiles occurs through merely taking in consideration the offset of the movement profiles with respect to one another. Thereby, a simple optimization of the movement in the system is possible.

In a further advantageous embodiment of the method, presetting of the offset between the respective transfer movement profiles, and adaptation of the respective transfer movement profiles to the offset are also included as further steps.

Through the presetting of an offset between the respective press movement profiles, the power input of the respective press can be equalized with respect to one another. Thus, a peak power input in short time ranges can be prevented, in particular if the offset is set so that the energy emitted by a press can be fed to another press.

If an offset equal to zero were selected, all the presses would be moved, if applicable, in a uniform manner, and the peak energy inputs would be accumulative. Through an advantageously selected offset, the power peaks can be equalized.

In a further advantageous embodiment of the method, the offset is adapted such that the system has as constant a power input as possible.

Through as constant a power input as possible, the operating costs of the system can be reduced.

In a further advantageous embodiment of the method, a speed of the transfer movement profile is changed between the respective second synchronization point and the respective third synchronization point and/or between the respective first synchronization point and fourth synchronization points.

The speed is advantageously altered in the region in which the transfer system is moved outside the press. The transfer movement profile of the transfer system describes the movement of the receiving element and optionally of the workpiece, which the receiving element carries.

The speed can be reduced in certain regions, if the offset of two press movement profiles prescribes this. If applicable, the movement profile can provide a waiting time in a region between the presses. Such a waiting time can be due to an offset of the press movement profiles of two presses.

In a further advantageous embodiment of the method, the respective transfer movement profiles are adapted in their path curve to the geometry and/or to the dimensions of the respective press.

An adaptation particularly occurs to increase the speed of the movement profile while maintaining boundary conditions.

An optimization of the locus curve of the respective movement profile takes place with known means, for example with optimal control algorithms. An optimization advantageously shortens the locus curve and/or reduces the curvature of the locus curve. Through the optimization of the locus curve, the speed of the respective movement profile can be increased and the workpiece can thus be processed more quickly in the system.

In a further advantageous embodiment of the method, the boundary conditions for the respective transfer movement profile take into consideration the geometry of the respective press, in particular the geometry of the respective tool of the press, the geometry of the respective workpiece and optionally the press movement profile.

With the geometry of the press, the tool and/or the workpiece, the shape and the dimension thereof are calculated as boundary conditions in calculating and/or presetting the movement profile.

Through the movement of the tool, the geometry and/or the dimensions change. This can be taken into consideration by the respective movement profile.

Through this embodiment, a particularly precise coordination of the movement profiles is possible. In addition, collisions can be efficiently prevented.

In a further advantageous embodiment of the method, the boundary conditions for the respective press movement profile take into consideration the processing of the workpiece and/or a safety distance from the respectively moved tool to the workpiece and to the respective transfer system.

The safety distance is advantageously selected so that, in the case of an unforeseen standstill of a transfer system, a press can still continue, without colliding with the workpiece or with the respective transfer system, in particular with the receiving element of the transfer system.

The movement profile for processing the workpiece is respectively preset in certain areas. Thus, a high-quality processing can be ensured.

In a further advantageous embodiment of the method, the respective transfer movement profile and/or the respective press movement profile is changed in speed between individual steps of the method, optionally is equipped with a waiting time and/or a change to the path curve occurs.

This configuration presents possibilities for taking into consideration an offset between the respective press movement profiles. In particular with a possible reduction of the speed, the speed can also be kept constant and the locus curve can be extended. Thus, accelerations of the workpiece can be reduced and thereby the workpiece can be protected during transport.

In a further advantageous embodiment of the method, the respective press movement profile, in particular the speed of the press movement profile, is configured as a cam function.

For some years, conventional eccentric presses are increasingly being replaced by servo presses. Through the use of servo presses, the formerly sinusoidal press movement profile can be replaced by a press movement profile adapted to the processing. In particular, the speed of the press movement profile is therefore advantageously able to be presented by a cam function.

As there is a variety of methods for calculating cams, the provision and the adaption or optimization of the press movement profile is possible in a simple manner.

The computer program product can be installed or stored on a computer-readable medium. The computer program product is configured for installation and running on a processing unit, in which within the running of the computer program product on the processing unit a method in accordance with the above-disclosed embodiments is performed.

To perform the method, the computer program is loaded into the main memory and is executed with a processor (CPU) of the processing unit.

The method stated above is performed, or the computer program product is executed on the processing unit, with the use of the method for providing at least one transfer movement profile and/or at least one press movement profile for the system.

The control device is configured to control the system, where the control device is provided to control presses, where the control occurs via movement profiles, which have been provided via disclosed embodiments of the method in accordance with the invention.

The system has at least one press and at least two transfer systems and the above-described control device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described and explained in further detail below with the aid of figures. Here, identical reference numbers designate the same elements. The features of the embodiments which are shown can be put together (also individually) by a person skilled in the art to form new embodiments of the invention, in which.

DETAILED DESCRIPTION OF THE EXEMPLARY EMBODIMENTS

Figure 1:
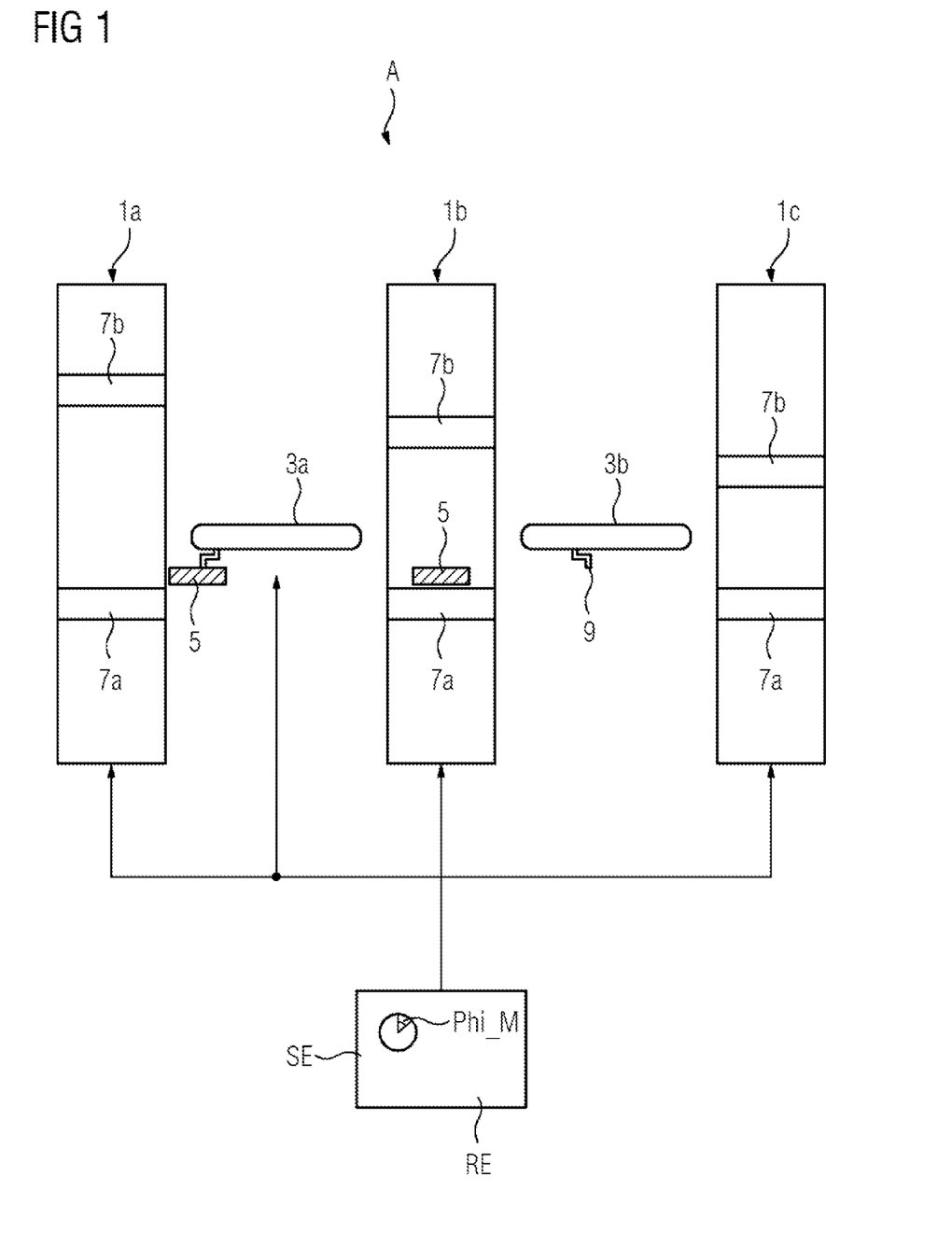
FIG. 1 shows a system in accordance with the invention.

FIG. 1 shows a system A. The system A has a first press 1a, a second press 1b and a third press 1c. A workpiece 5 is transferred by a first transfer system 3a from the first press 1a to the second press 1b. Another workpiece 5 is situated in the second press 1b and is processed in the second press 1b. A second transfer system 3b serves for transferring a workpiece 5 from the second press 1b and the third press 1c. The transfer systems 3a, 3b have, respectively, a receiving element 9. The receiving element 9 serves for receiving and transporting the workpiece 5 from a press 1a, 1b, 1c to the other press 1a, 1b, 1c. The respective transfer system 3a, 3b, in particular the respective receiving element 9, serves for the introduction and extraction of the workpiece 5 into or, respectively, out from the press 1a, 1b, 1c.

The presses 1a, 1b, 1c have respectively an upper tool 7b and respectively a lower tool 7a. The lower tool 7a serves in particular for receiving the workpiece 5 and the upper tool 7b serves for the processing of the workpiece 5.

The presses 1a, 1b, 1c are connected to a control device SE. The control device SE comprises a virtual axis that presets a master rotation angle Phi_M. With the master rotation angle Phi_M, also or alternatively a time t can be preset. Press movement profiles B1 orientate themselves to the master rotation angle Phi_M. The master rotation angle Phi_M or the time t corresponds to a timing generator for the presses 1a, 1b, 1c. In addition, the control device serves for the activation of the respective transfer system 3a, 3b. Preferably, transfer movement profiles B2 orientate themselves to the master rotation angle Phi_M or to the time t.

Figure 2:
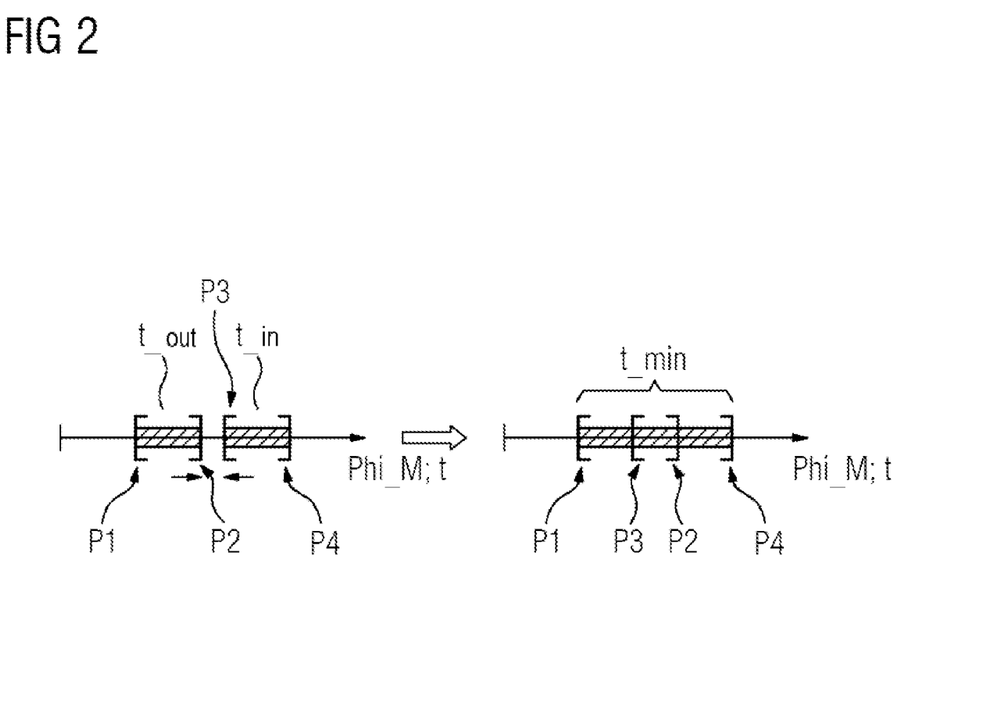
FIG. 2 shows an overlapping of time ranges in accordance with the invention.

FIG. 2 shows an overlapping of time ranges t_in, t_out. The time ranges t_in, t_out are defined by synchronization points P1, P2, P3, P4. A first time range t_in (introduction time range) begins at a first synchronization point P1 and ends at a second synchronization point P2. The first synchronization point P1 defines the entry of the transfer system 3a, 3b into the press 1a, 1b, 1c. The second synchronization point P2 defines the exit of the transfer system 3a, 3b from the press 1a, 1b, 1c.

A second time range t_out (extraction time range) begins at a third synchronization point P3 and ends at a fourth synchronization point P4. The third synchronization point P3 defines the entry of the transfer system 3a, 3b into the further press 1a, 1b, 1c. The fourth synchronization point P4 defines the exit of the transfer system 3a, 3b from the further press 1a, 1b, 1c.

The first timeline shows the time ranges t_in, t_out successively following chronologically.

With reference to the respective transfer movement profile B2 the first synchronization point P1 defines the entry of the first transfer system 3a into the first press 1a, the second synchronization point P2 defines the exit of the first transfer system 3a from the first press 1a, the third synchronization point P3 defines the entry of the first transfer system 3a into the second press 1b, the fourth synchronization point P4 defines the exit of the first transfer system 3a from the second press 1b.

On the right-hand side of FIG. 2, the two time ranges t_in, t_out are disjunct. A risk of collision of the transfer systems 3a, 3b with respect to one another or of the transfer system 3a, 3b with the workpiece 5 in the press 1a, 1b, 1c does not exist.

On the left-hand side of FIG. 2, the time ranges t_in, t_out have been shifted over one another, i.e., the time ranges t_in, t_out overlap one another with regard to time range. The time ranges are shifted into one another to the extent that the third synchronization point P3 lies before the second synchronization point P2.

The abscissa or the arrow in the right-hand and left-hand part of FIG. 2 symbolizes a continuance of the time t. The time t can also correspond to a master rotation angle Phi_M. An instant of time respectively corresponds to a value of the master rotation angle Phi_M, because it is assumed that the virtual axis, as shown in FIG. 1, is moved at constant rotational speed.

Therefore, the respective synchronization points P1, P2, P3, P4 correspond both to an instant of time and to a master rotation angle Phi_M.

When the time ranges t_in, t_out are overlapped as far as possible while maintaining the boundary conditions RB, a minimized time range of the minimum time t_min results. The minimum time t_min indicates at least how long the press must be opened, in order to enable an introduction and an extraction of the workpiece 5 into or, respectively, out from the press 1a, 1b, 1c.

Figure 3:
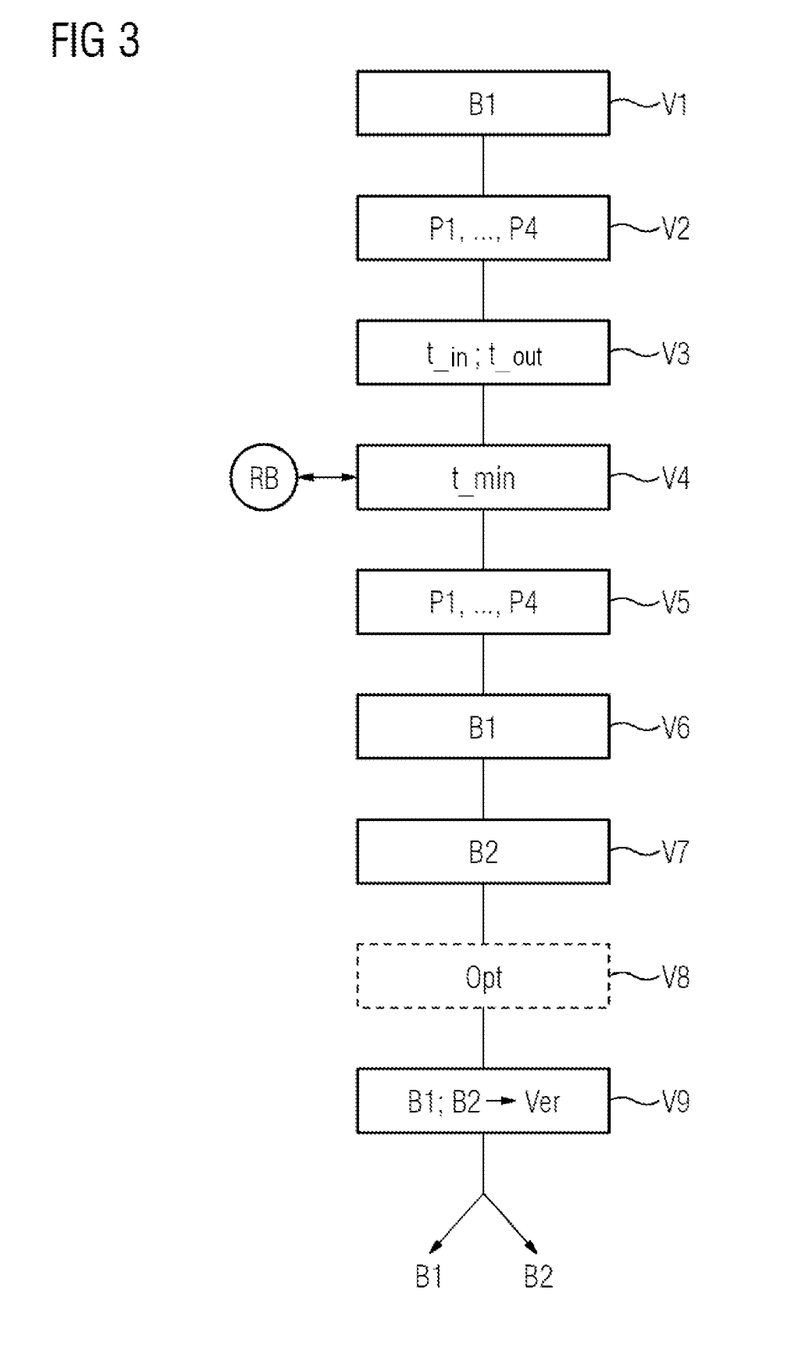
FIG. 3 shows a representation of the method in accordance with the invention.

FIG. 3 shows a representation of the method. The method comprises nine method steps V1 to V9, which are described below.

In the first method step V1, the press movement profile B1 is determined. The determining occurs preferably via the intended processing of the workpiece 5. In addition, the transfer movement profile B2 can be determined through its locus curve and optionally through its speed v.

In the second method step V2, the synchronization points P1, P2, P3, P4 are determined. The determining occurs such that the instants of time or, respectively, the master rotation angles Phi_M of the respective transfer movement profile B2 are marked.

The first synchronization point P1 is the point at which the transfer system 3a, 3b that removes the workpiece 5 out from the press 1a, 1b, 1c enters into the press 1a, 1b, 1c.

The second synchronization point P2 corresponds to the instant of time t or, respectively, the master rotation angle Phi_M, at which the transfer system 3a, 3b that removes the workpiece 5 from the press 1a, 1b, 1c exits from the press.

The third synchronization point P3 is the point at which the transfer system 3a, 3b that introduces the workpiece 5 into the presses 1a, 1b, 1c enters into the press 1a, 1b, 1c.

The fourth synchronization point P4 corresponds to the instant of time t or, respectively, the master rotation angle Phi_M, at which the transfer system 3a, 3b that introduces the workpiece 5 into the press 1a, 1b, 1c exits from the press 1a, 1b, 1c.

In the third method step V3, the introduction time t_in and the extraction time t_out are determined.

In the fourth method step V4, while maintaining the boundary conditions RB, the time ranges t_in, t_out are shifted together in an overlapping manner to the extent that the time range in which a transfer system is situated in the press 1a, 1b, 1c is the minimum time. The boundary conditions are, in particular, geometric factors that prevent the respective transfer system 3a, 3b from colliding with the press and/or that prevent the transfer systems 3a, 3b from colliding with one another or, respectively, with the workpiece 5 itself.

In the fifth method step, based on the new minimum time t_min, new synchronization points P1, P2, P3, P4 are determined on the respective transfer movement profile B2.

With the new synchronization points P1, P2, P3, P4, in the sixth method step V6, the press movement profile B1 is determined. In particular, the speed v is increased or the stroke rate of the respective press 1a, 1b, 1c is increased.

In the seventh method step V7, the transfer movement profile B2 is determined with the new synchronization points P1, P2, P3, P4.

In an optional eighth method step V8, the respective press movement profile B1 and/or the respective transfer movement profile B2 are optimized. The optimization can be an optimization of the respective locus curve, so that the speed v of the respective transfer movement profile B2 can be increased or the load of the receiving element 9 of the transfer system 3a, 3b is relieved by a smaller acceleration.

In the ninth method step V9, according to the movement profiles B1, B2, the offset Ver of the respective press movement profiles B1 with respect to one another is determined. The offset Ver is configured here as chronological offset Ver of the respective press movement profiles B1 or as master rotation angle offset Ver of the respective press movement profiles B1. The offset indicates by which time t and/or by which master rotation angle offset Ver the one press 1a, 1b, 1c follows the respectively other press 1a, 1b, 1c. By the method described above, the throughput time of the workpiece 5 through the system A can be shortened.

Figure 4:
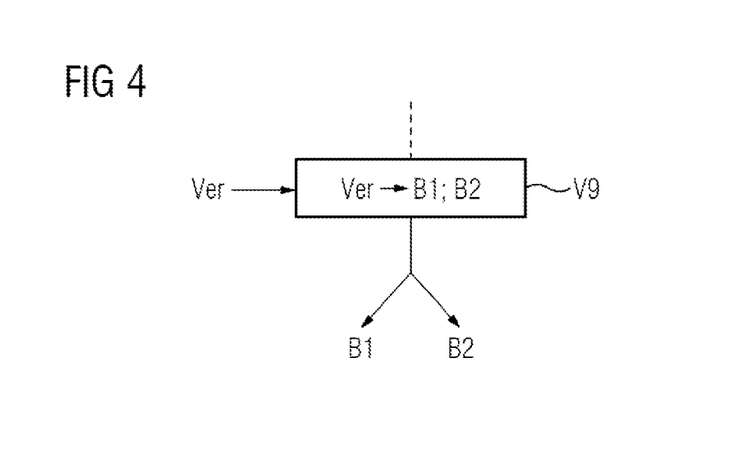
FIG. 4 shows a representation of a portion of the method of FIG. 3.

FIG. 4 shows a representation of a portion of the method. Here, the method is performed in an analogous manner to what is stated above up to the ninth method step V9. In order to guarantee a particularly balanced power input of the system A, the offset of the presses is preset. With the offset, if applicable, the speed v of the transfer movement profile B2 is reduced in certain areas. A brief standstill of the respective transfer system 3a, 3b is also possible. Here, the receiving element 9 of the respective transfer system 3a, 3b waits before the third synchronization point P3, so that the introduction of the workpiece 5 into the respective press 1a, 1b, 1c occurs slightly later.

Figure 5:
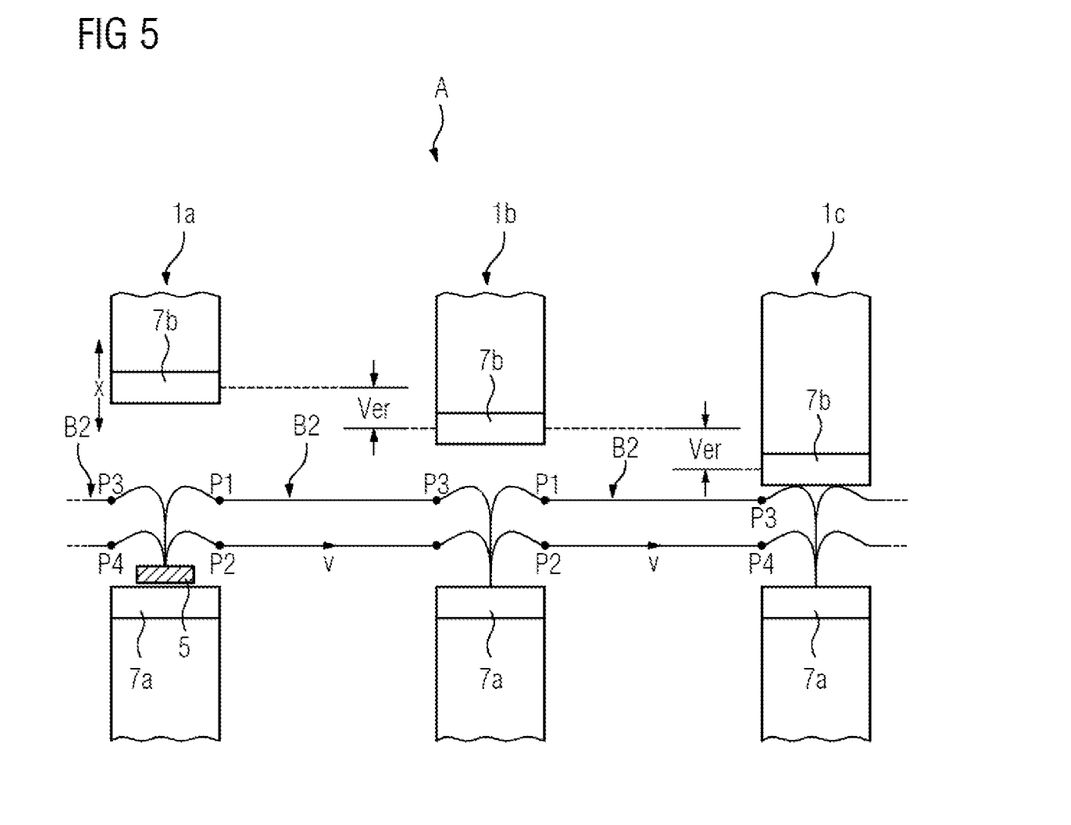
FIG. 5 shows movement profiles in accordance with the invention.

FIG. 5 shows movement profiles B1, B2. The transfer movement profile B2 is shown respectively in its locus curve. The speed v of the movement profile can be constant or can be different for each point. The transfer movement profile B2 can be configured respectively as a cam function—optionally linked with a locus function or, respectively, locus curve. The movement of the upper tool 7*b* of the respective press 1*a*, 1*b*, 1*c* is marked by the double arrow x. The movement of the respective upper tool 7*b* is also described advantageously by a cam function.

In addition, the offset Ver between the respective upper tools 7*b* of the respectively adjacent presses 1*a*, 1*b*, 1*c* is shown. The synchronization points P1, P2, P3, P4 are shown as points on the respective transfer movement profile B2. The arrow direction of the respective transfer movement profile B2 indicates the throughput direction of the respective transfer movement profile B2. The transfer movement profiles B2 indicate the travel path of the workpiece 5, which is represented in the first press 5 on the lower tool 7*a*.

Figure 6:
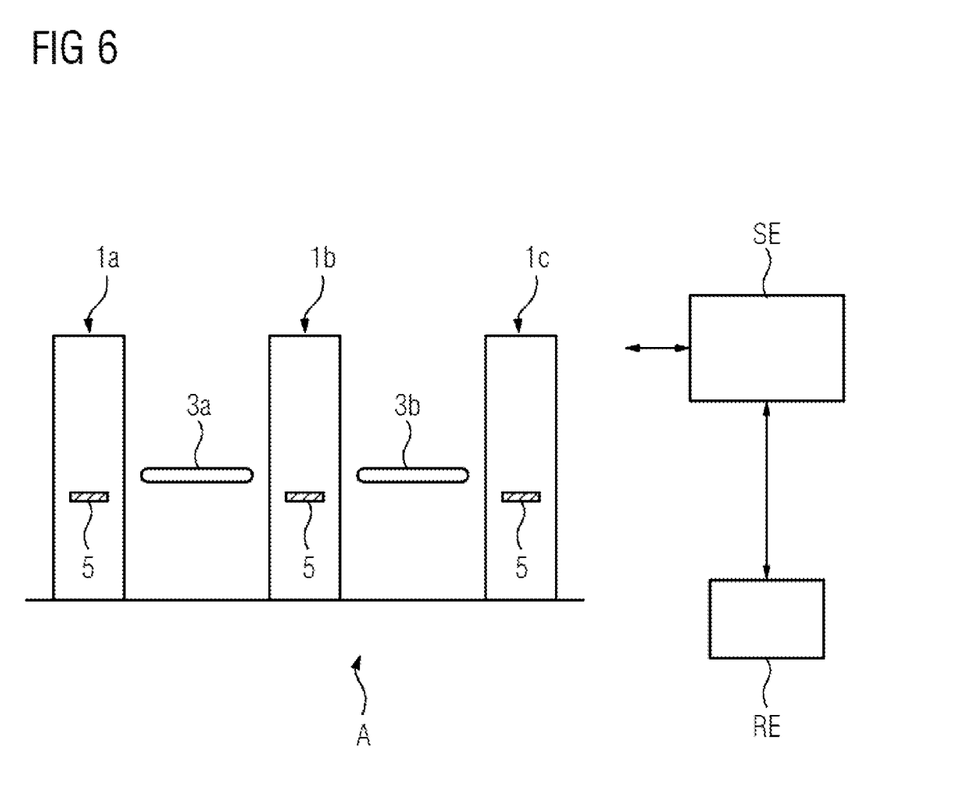
FIG. 6 shows a system with a control device in accordance with the invention.

FIG. 6 shows a system A with a control device SE. The control device SE serves for controlling the system A. The system A has presses 1*a*, 1*b*, 1*c* and transfer systems 3*a*, 3*b*. The control device SE is associated with a processing unit RE. The processing unit serves for providing the movement profiles B1, B2, and optionally the respective offset. The control device controls the system via the movement profiles B1, B2 and/or the offset Ver.

In summary, the invention relates to a method for optimizing movement profiles B1, B2, a method for providing movement profiles B1, B2 and a control device SE and a system A. The movement profiles B1, B2 serve for the determination of the movement of tools 7*a*, 7*b* of a press 1*a*, 1*b*, 1*c* and the movement of a receiving element 9 for a workpiece 5 of a transfer system 3*a*, 3*b*. Transfer movement profiles B2 are synchronized with one another via press movement profiles B1. The synchronization of the transfer movement profiles B2 occurs in particular by chronologically shifting synchronization points P1, P2, P3, P4 via boundary conditions RB. Through the synchronization, an offset of the press movement profiles B1 can be determined, so that the workpiece 5 can be processed as quickly as possible through the system A.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for optimizing movement profiles in a system including at least one press with an upper tool for processing a workpiece and a plurality of transfer systems, a movement of a respective upper tool being respectively described by a press movement profile, and a movement of a respective transfer system being respectively described by a transfer movement profile, the optimizing of the movement profiles comprising:

presetting a respective transfer movement profile of the respective transfer system;

presetting synchronization points via the respective transfer movement profile of the respective transfer system, a first synchronization point defining an entry of a first transfer system into the at least one press, a second synchronization point defining an exit of the first transfer system from the at least one press, a third synchronization point defining an entry of a second transfer system into the at least one press and a fourth synchronization point defining an exit of the second transfer system from the at least one press;

assigning respective instants of time to the synchronization points;

defining a first time range between the first synchronization point and the second synchronization point;

defining a second time range between the third synchronization point and the fourth synchronization point;

shortening the first and second time ranges successively to minimum times whilst maintaining boundary conditions such that the first and second time ranges overlap; and creating respective optimized press movement profiles of the upper tool for processing the workpiece based on the minimum times.

2. The method as claimed in claim 1, further comprising: synchronizing the respective press movement profiles with respect to one another via an offset.

3. The method as claimed in claim 2, wherein the offset is set such that a minimum possible throughput time of a workpiece through the system is achieved.

4. The method as claimed in claim 1, further comprising: presetting an offset between respective transfer movement profiles; and adapting the respective transfer movement profiles to the offset.

5. The method as claimed in claim 4, wherein the offset is adapted such that the system has a power input that remains as constant as possible.

6. The method as claimed in claim 4, wherein a speed of the transfer movement profile is changed at least one of (i) between the respective first synchronization points and third synchronization points and (ii) between the respective second synchronization point and fourth synchronization points.

7. The method as claimed in claim 5, wherein a speed of the transfer movement profile is changed at least one of (i) between the respective first synchronization points and third synchronization points and (ii) between the respective second synchronization point and fourth synchronization points.

8. The method as claimed in claim 1, wherein respective transfer movement profiles are adapted in their path curve to at least one of (i) a geometry and (ii) dimensions of a respective press.

9. The method as claimed in claim 1, wherein the boundary conditions for a respective transfer movement profile take into consideration at least one of (i) a geometry of the at least one press, (ii) a respective workpiece and (iii) the press movement profile.

10. The method as claimed in claim 9, wherein the geometry of the at least one press comprises a geometry of a respective tool of the at least one press.

11. The method as claimed in claim 1, wherein the boundary conditions for the respective press movement profile take into consideration at least one of (i) processing of the workpiece and (ii) a safety distance from a respectively moved tool to at least one of the workpiece and the respective transfer system.

12. The method as claimed in claim 1, wherein a speed of at least one of (i) the respective transfer movement profile and (ii) the respective press movement profile is changed between individual steps of the method.

13. The method as claimed in claim 12, wherein at least one of (i) the respective transfer movement profile and (ii) the respective press movement profile is equipped with at least one of a waiting time and a change to a path curve.

14. The method as claimed in claim 1, wherein the respective press movement profile is configured as a cam function.

15. The method as claimed in claim 14, wherein the speed of the press movement profile is configured as a cam function.

16. The method of claim 1, wherein at least one of (i) at least one transfer movement profile and (ii) at least one press movement profile is provided for the system.

17. A non-transitory computer program product for installation encoded with a computer program which, when executed on a processing unit, causes and optimization of movement profiles in a system including at least one press with an upper tool for processing a workpiece and a plurality of transfer systems, a movement of a respective upper tool being respectively described by a press movement profile, and a movement of a respective transfer system being respectively described by a transfer movement profile, the computer program comprising:
program code for presetting a respective transfer movement profile of the respective transfer system;
program code for presetting synchronization points via the respective transfer movement profile of the respective transfer system, a first synchronization point defining an entry of a first transfer system into at least one press, a second synchronization point defining an exit of the first transfer system from the at least one press, a third synchronization point defining an entry of a second transfer system into the at least one press and a fourth synchronization point defining an exit of the second transfer system from the at least one press;
program code for assigning respective instants of time to the synchronization points;
program code for defining a first time range between the first synchronization point and the second synchronization point;
program code for defining a second time range between the third synchronization point and the fourth synchronization point;
program code for shortening the first and second time ranges successively to minimum times whilst maintaining boundary conditions such that the first and second time ranges overlap; and
program code for creating respective optimized press movement profiles of the upper tool for processing the workpiece based on the minimum times.

18. A control device for a system, the control device controlling presses;
wherein the control occurs via movement profiles which have been provided via a method comprising:
presetting a respective transfer movement of a respective transfer system;
presetting synchronization points via the respective transfer movement profile of the respective transfer system, a first synchronization point defining an entry of a first transfer system into at least one press, a second synchronization point defining an exit of the first transfer system from the at least one press, a third synchronization point defining an entry of a second transfer system into the at least one press and a fourth synchronization point defining an exit of the second transfer system from the at least one press;
assigning respective instants of time to the synchronization points;
defining a first time range between the first synchronization point and the second synchronization point;
defining a second time range between the third synchronization point and the fourth synchronization point;
shortening the first and second time ranges successively to minimum times whilst maintaining boundary conditions such that the first and second time ranges overlap; and
program code for creating respective optimized press movement profiles of an upper tool for processing the workpiece based on the minimum times.

19. A system comprising:
at least one press having an upper tool for processing a workpiece and a lower tool;
at least two transfer systems; and
a control device which controls presses;
wherein the control occurs via movement profiles which have been provided via a method comprising:
presetting a respective transfer movement profile of a respective transfer system;
presetting synchronization points via the respective transfer movement profile of the respective transfer system, a first synchronization point defining an entry of a first transfer system into at least one press, a second synchronization point defining an exit of the first transfer system from the at least one press, a third synchronization point defining an entry of a second transfer system into the at least one press and a fourth synchronization point defining an exit of the second transfer system from the at least one press;
assigning respective instants of time to the synchronization points;
defining a first time range between the first synchronization point and the second synchronization point;
defining a second time range between the third synchronization point and the fourth synchronization point;
shortening the first and second time ranges successively to minimum times whilst maintaining boundary conditions such that the first and second time ranges overlap; and
creating respective optimized press movement profiles of the upper tool for processing the workpiece based on the minimum times.

* * * * *